United States Patent [19]

Bailey et al.

[11] Patent Number: 4,756,374

[45] Date of Patent: Jul. 12, 1988

[54] VEHICLE LOAD SENSING DEVICE

[76] Inventors: John D. Bailey, 725 N. Michigan, Hastings, Mich. 49058; Robert L. Munn, 10798 Montcalm Ave., Freeport, Mich. 49325; Henry A. Thenikl, 1881 Bachman Rd., Hastings, Mich. 49058

[21] Appl. No.: 32,507

[22] Filed: Mar. 31, 1987

[51] Int. Cl.$^4$ .................... G01G 19/08; G01G 21/28
[52] U.S. Cl. ...................................... 177/137; 177/128
[58] Field of Search ........... 177/136, 137, 138, 210 C, 177/128, 244

[56] References Cited

U.S. PATENT DOCUMENTS

| | | | |
|---|---|---|---|
| Re. 14,475 | 5/1918 | Troll | 177/137 |
| 1,147,127 | 7/1915 | Troll | 177/137 |
| 1,956,096 | 4/1934 | Goodale | 177/137 |
| 3,867,990 | 2/1975 | Askew | 177/137 |
| 3,955,636 | 5/1976 | Askew | 177/137 |
| 4,312,042 | 1/1982 | Bateman | 177/136 X |
| 4,384,628 | 5/1983 | Jackson | 177/137 |

OTHER PUBLICATIONS

Advertising Brochure by Sperry Corporation, H61-57-11-01-00, Nov. 1985.
Donahoe, Tom, Capacitance-Based Angular Measurement, Sensors, Nov. 1985.

Primary Examiner—George H. Miller, Jr.
Attorney, Agent, or Firm—Varnum, Riddering, Schmidt & Howlett

[57] ABSTRACT

A device (10) for providing an indication of loads exerted on a vehicle frame (12) comprises a sensing unit (22) mounted to and between the frame (12) and the vehicle axle (14) and for detecting vertical displacement of the frame (12) relative to the axle (14) when loads are exerted on the frame (12). The sensing unit (22) comprises an arm (126) pivotally mounted to the frame (12), through a pair of telescoping tubes (32, 44), and an adjustment rod (124) movably mounted to and between the arm (126) and the axle (14). When a load is exerted on the frame (12), the same depresses relative to the axle (14) and the arm (124) rotates. Rotational movement of the arm (124) is measured by a clinometer (128) mounted thereto and which converts the angular measurement into a coherent digital or analogue readout displayed by a receiving unit (26).

18 Claims, 3 Drawing Sheets

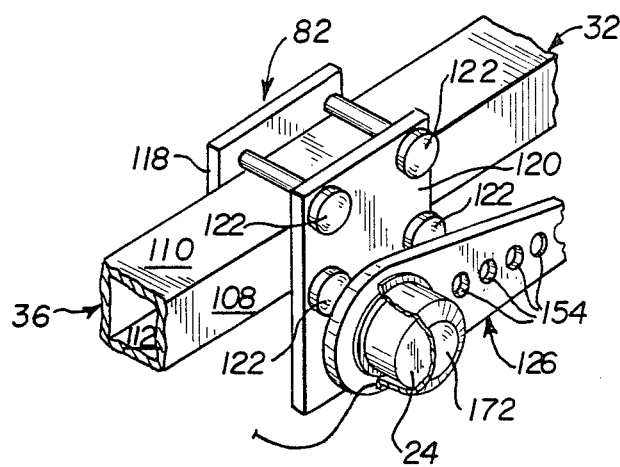
FIG. 4
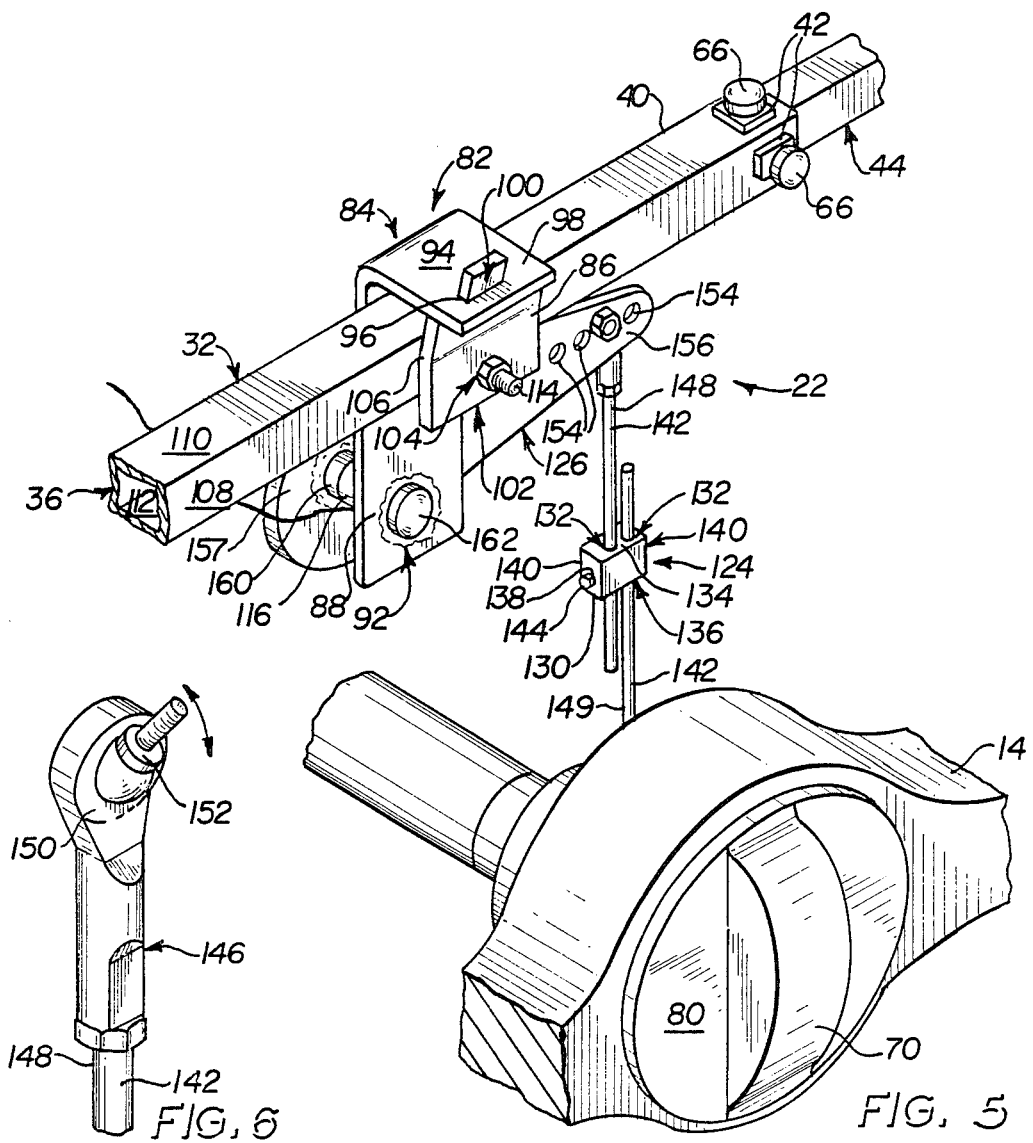
FIG. 6
FIG. 5

VEHICLE LOAD SENSING DEVICE

FIELD OF THE INVENTION

The invention relates to a device for determining the weight of a load exerted on a vehicle frame, and more particularly to a device for measuring vertical displacement of vehicle frame relative to a vehicle axle when a load is exerted on the frame and for converting such measure into a coherent readout indicating the weight of the load.

BACKGROUND OF THE INVENTION

Manufacturers, owners and operators of trucks, such as single and tandem tractor trailor combinations, must be cognizant of loads placed on the trucks for a number of reasons. First, these entities must be assured of safe operation of the vehicle. The weight capacity of a truck is often known by the operator thereof by reason of the manufacturer of the truck placing on the vehicle a warning notice of such weight capacity. Exceeding the weight capacity can place the truck under unnecessary strain, which could result in accidents or breakdown of the vehicle during operation of the same. In addition, overloading the truck can impair the life of the vehicle and increase repair costs, tire expenses, etc. Also, from the manufacturer standpoint, its and its product's reputation is affected by reason of complaints from owners or purchasers of the vehicles of such repair costs, vehicle breakdown, etc. Further, operators must be aware of vehicle load condition so as to avoid violating road weight safety regulations imposed by state and federal governmental bodies.

The cautious owner/operator of the vehicle, being aware of the foregoing negative consequences of vehicle overload, often, in order to be on the safe side, "underloads" the truck thereby reducing the operative efficiency thereof by increasing the unit cost per pound of the cargo loaded.

Therefore, it has been found advantageous to provide a device adapted to mount to a vehicle and advise the vehicle operator of the overload or underload condition of the vehicle so that the weight capacity of the same will not be exceeded, governmental regulations will not be violated and the operating efficiency of the vehicle will not be reduced because of failure to load the truck to its "rated" capacity.

When a load is placed on a vehicle, the frame thereof depresses relative to the vehicle axle which remains stationary relative to the clearance above ground. The vertical distance between the vehicle frame and axle will thus change or decrease as heavier loads are placed on the vehicle. It has thus been found favorable to provide a device which functions between these moving and stationary parts of the vehicle to detect the change in distance between such parts and to convert such change in distance into a measurable property which can be translated to the vehicle operator to indicate vehicle load weight.

Many such devices are known. For example, U.S. Pat. Nos. to Askew, 3,867,990 and 3,955,636, issued Feb. 25, 1975 and May 11, 1976, respectively, disclose a device for measuring and providing an indication of loads exerted on a vehicle and comprising a mounting bar secured to the vehicle frame, a collar adjustably mounted to the bar, a transducer mounted to the collar, a toggle arm pivotally mounted to the transducer, and a sensor arm pivotally mounted at the upper end thereof to the toggle arm and at the lower end thereof to the vehicle differential. In this manner, when a load is exerted on the vehicle frame, the same depresses relative to the differential which urges the toggle arm to rotate. The transducer converts the angular deflection of the toggle arm into a potential electric property. An electrical gauge positioned, for example, in the vehicle cockpit, is adapted to receive the output from the transducer to inform the vehicle operator of the load condition of the vehicle.

The transducer includes a spindle associated with a light beam, a shutter for the light beam and a photoelectric cell receiving the light beam. Alteration of the distance between the frame and the differential detected by the toggle arm is followed by proportional rotation of the spindle which causes the light beam to be proportionally modified by the shutter in a manner which is detected by the photoelectric cell and converted into a dielectric property output received by the electrical gauge.

In addition, U.S. Pat. No. to Goodale, 1,956,096, issued April 24, 1934, discloses a device for detecting vehicle load weights and comprising a sensor secured to the vehicle frame and an actuating lever pivotally mounted at one end to the sensor and at the other end to an actuating bar securely connected to the vehicle axle. The sensor comprises a piston connected to the lever arm through a rack and pinion assembly. In operation, when a load is exerted on the vehicle frame, the actuating lever rotates and causes the piston, through fluid pressure, to move a pointer of a gauge to a position indicating the load exerted on the vehicle.

SUMMARY OF THE INVENTION

According to the invention, a device is adapted to be mounted to a vehicle for providing an indication of loads exerted on the vehicle. The vehicle comprises a drivetrain and a frame movable relative to the drivetrain. The frame comprises, on each side of the vehicle, an elongated, substantially C-shaped, in cross section, frame member having upper and lower legs extending along longitudinal axes of the frame member.

The device comprises a sensing means operable between the frame and the drivetrain and for detecting an alteration in distance between the frame and the drivetrain when a load is exerted on the vehicle, a clinometer means responsive to the sensing means for converting the alteration and distance detected by the sensing means to an output signal, a receiving means for receiving the output signal and indicating magnitude of a load exerted on the vehicle and a frame-mounting means for mounting the sensing and clinometer means to the vehicle.

The frame mounting means comprises a first mounting means for selectively mounting the sensing means at any one of a number of vertical and longitudinal positions relative to the frame. The first mounting means is adapted to be mounted to and anywhere along the length of one of the upper and lower legs of the frame to mount the sensing means at any one of a number of vertical and longitudinal positions relative to the frame. In addition, the first mounting means is adapted to be selectively mounted to one of the upper and lower legs at a plurality of vertical positions relative to one of the upper and lower legs. Specifically, the frame mounting means is adapted to be mounted on the frame, with a longitudinal axis of the frame mounting means extending substantially perpendicular to the frame, the frame mounting means comprising a dimension in a first direction substantially perpendicular to the longitudinal axis of the frame mounting means and a dimension in the second direction unequal to the dimension in the first direction and substantially perpendicular to the first direction and the longitudinal axis of the frame mounting means. In this manner, the frame mounting means can be rotated about its longitudinal axis to alter the vertical-position of the sensing means relative to the frame.

In addition, the frame mounting means comprises a second mounting means for selectively mounting the sensing means at any one of a number of positions transverse of the frame. Specifically, the frame mounting means comprises an elongated member adapted to be mounted to and between the spaced frame members of the frame. The second mounting mean is adapted to be mounted to and along a longitudinal axis of the elongated member to mount the sensing means at any one of a number of positions transverse of the frame.

In an alternative embodiment of the frame mounting means, the same comprises a pair of telescoping tubes adapted to be mounted to and between the spaced frame members of the frame and to move longitudinally relative to each other to extend or contract the length of the frame mounting means to adjust the length of the frame mounting means in accordance with the distance between the spaced frame members of the frame.

The sensing means comprises an arm pivotally mounted to the frame mounting means and adapted to rotate in response to an alteration in distance between the frame and the drivetrain.

The clinometer means comprises a capacitive gravity sensor mounted to the arm and adapted to rotate with the arm to measure rotational movement of the arm and to convert the rotational movement into the output signal.

In addition, the device comprises a drivetrain mounting means for mounting the sensing means to the vehicle drivetrain. The sensing means further comprises an adjustable rod means adapted to be mounted to and between the drivetrain means and the pivoting arm and adjusted longitudinally to vary the length of the rod means.

Specifically, the adjustable rod means comprises a bearing and a pair of substantially parallel first and second vertical rods lockably and telescopically received in the bearing and movable longitudinally relative to each other, with the first rod adapted to be mounted, at a first end thereof, to the pivoting arm, and the second rod adapted to be mounted, at a second end thereof opposite the first end of the first rod, to the drivetrain mounting means. The first and second rods are adapted to be movably mounted to the pivoting arm and the drivetrain mounting means, respectively, for movement in a plurality of directions in three-dimensional space. In addition, the adjustable rod means is adapted to be selectively mounted to and along any one of a number of positions on a longitudinal axis of the pivoting arm.

BRIEF DESCRIPTION OF THE DRAWINGS

The invention will now be described with reference to the drawings in which:

FIG. 4 is an enlarged rear perspective view of an alternative embodiment of a connection between outer and inner tube assemblies of the invention and a sensing unit of the same;

FIG. 5 is an enlarged rear perspective view of the sensing unit; and

FIG. 6 an enlarged perspective view of a ball end connector of the sensing unit.

DESCRIPTION OF THE PREFERRED EMBODIMENTS

Figure 1:
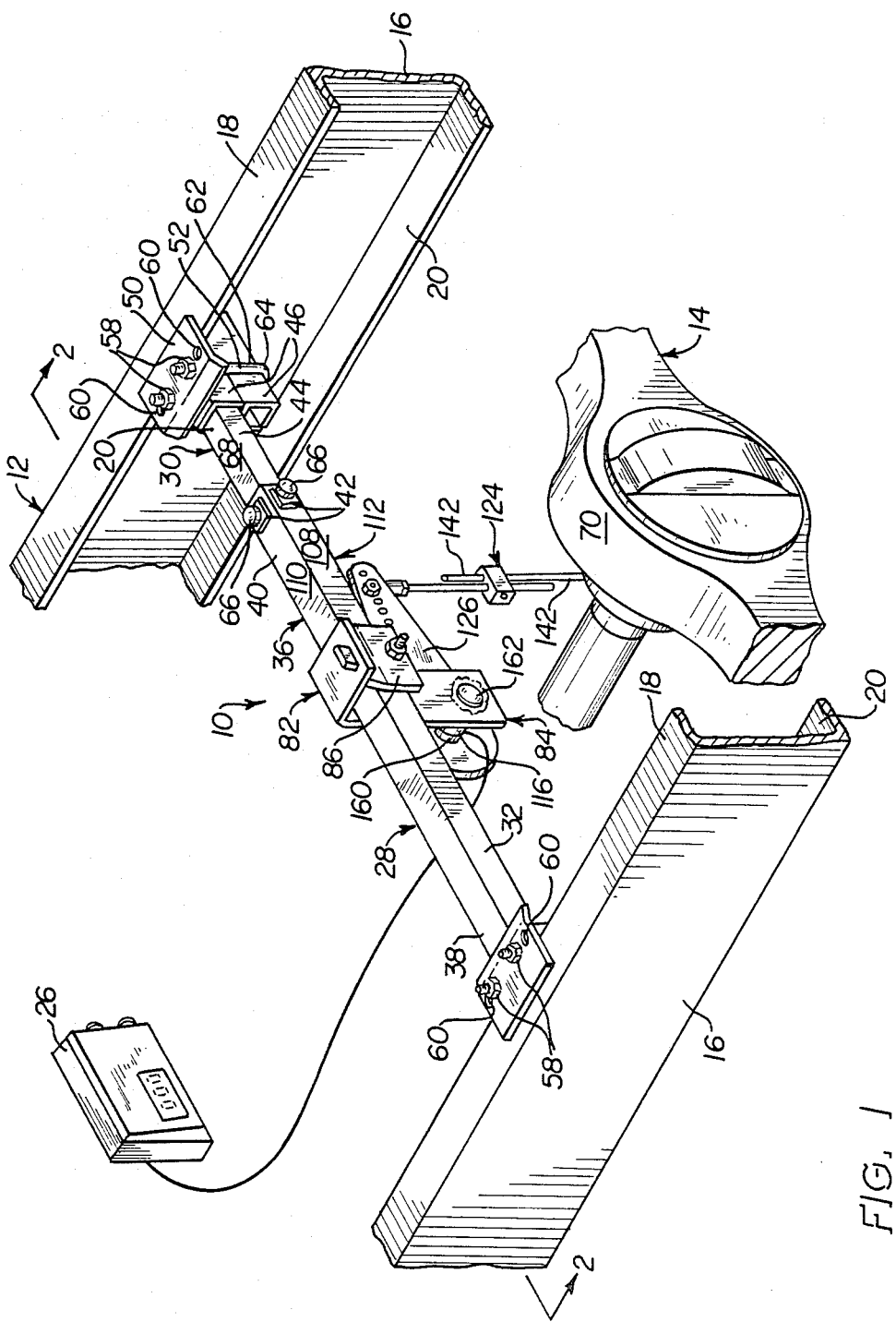
FIG. 1 is a rear perspective view of a vehicle load sensing device according to the invention mounted to and between a vehicle frame and a vehicle axle.

Referring now to the drawings in detail, and in particular to FIG. 1, there is shown a device 10 operable between a vehicle frame 12 and a vehicle axle 14 and adapted to measure vertical displacement of the frame with respect to the axle when a load is exerted on the frame and to convert such alteration in distance into a electric property readable by an operator of the vehicle to determine the magnitude of the load exerted on the same.

The frame 12 comprises a pair of elongated, parallel, spaced-apart, C-shaped, in cross section, frame members 16 having upper legs 18 and lower legs 20. The frame members are positioned in opposing relationship so that the legs 18, 20 of the frame members face one another. As will be described below in detail, the legs 18, 20 function as a convenient point of attachment of the device 10 to the frame 12.

The device 10 comprises a sensing unit 22 mounted to and between the frame 12 and the axle 14 and for sensing displacement of the frame relative to the axle when a load is exerted on the frame, a clinometer 24 mounted to the sensing unit and for performing the above-stated conversion function and a unit 26 for receiving an output from the clinometer and advising the vehicle operator of the load condition of the vehicle.

Figure 2:
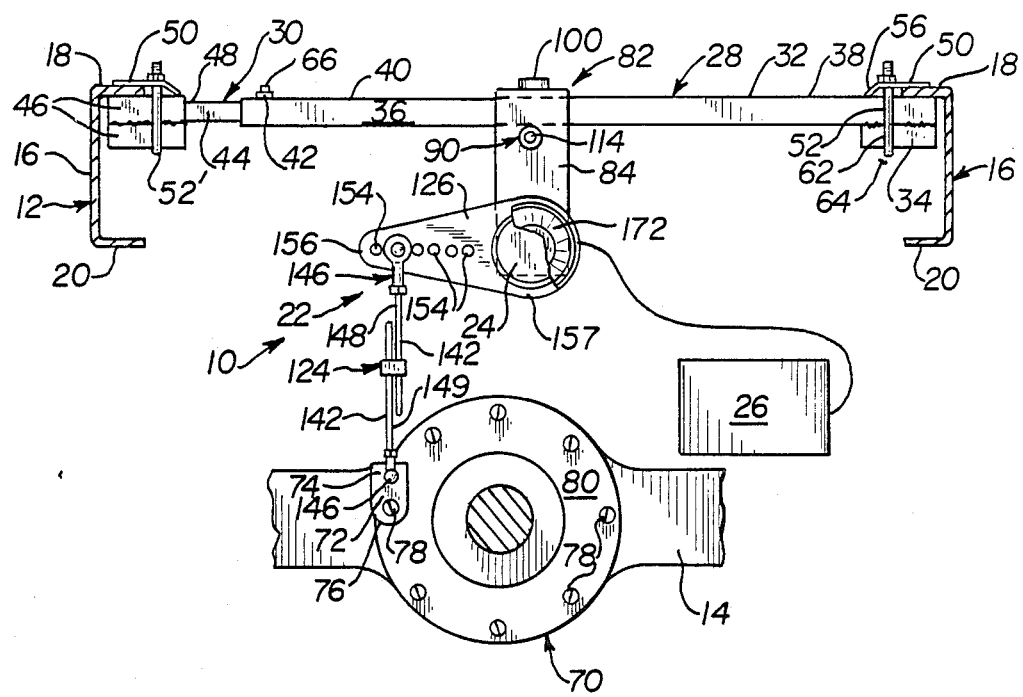
FIG. 2 is a front elevational view of the load sensing device taken along lines 2—2 of FIG. 1.

As stated above, the sensing unit 22 is mounted to the frame 12 and to this end, the device 10 comprises, as most clearly illustrated in FIGS. 1 and 2, a pair of outer and inner telescoping tube assemblies 28, 30 mounted to and between the frame members 16 of the frame. The outer tube assembly 28 comprises an elongated, rigid, square, in cross section, outer tube 32, and a relatively short, square, in cross section, outer spacer tube 34 secured, as by welding, to an outer end 38 of the outer tube 32. The spacer tube 34 has external dimensions identical to those of the outer tube 32. An inner end 40 of the outer tube 32 has rigidly secured thereto, on one or more front, back, top and bottom walls 36, 108, 110 and 112, respectfully, of the tube 32, a weld nut 42 having a threaded bore (not shown) aligned with a bore (not shown) extending through the outer tube 32. The function of the weld nuts 42 will be described below in detail.

The inner tube assembly 30 is a three-member assembly comprising an elongated, rigid, square, in cross section, inner tube 44 and a pair of identical, relatively short, square, in cross section, inner spacer tubes 46. The inner spacer tubes 46 are rigidly secured together, as by welding, at adjacent sides 48 of the tubes 46. The inner tube 44 has an external dimension which is slightly less than an internal dimensions of the inner spacer tubes, and an outer part 48 of the inner tube 44 slidably engages and is rigidly secured to, as by welding, one of the inner spacer tubes 46.

The external dimension of the inner tube 44 is slightly less than the internal dimension of the outer tube 32, and an inner part (not shown) of the inner tube telescopically engages the outer tube at the outer end 38 thereof. The telescopic relationship between the outer and inner tubes 32, 44 permits mounting of the tubes, and thus the sensing unit 22 and the clinometer 24, to vehicles varying with respect to the spacing between the frame members 16 of the vehicle frame 12. In addition, use of the telescoping tubes 32, 44 facilitates installation of the device 10 on the vehicle frame 12. For example, when installing the device 10 on a vehicle having a relatively crowded undercarriage, the outer and inner tubes 32, 44 can be set in full telescopic engagement prior to setting the tubes into a position over the vehicle axle for mounting to the frame members 16. In full or substantially full telescopic engagement, the collapsed condition of the tubes 32, 44 permits the same to be more easily positioned over the differential and other obstructions. Once so positioned, the tubes 32, 44 can be extended to be set into a position for secure mounting to the frame members 16 as described below.

As illustrated in FIGS. 1 and 2, each of the outer and inner telescoping tubes 32, 44 is mounted to a frame member 16 by a mounting bracket 50 and a U-bolt 52. The mounting bracket 50 includes a relatively long main body portion 54 and a relatively short tang portion 56 positioned at a predetermined angle with respect to the main body portion. The mounting bracket 50 also includes pairs of inner and outer holes 58, 60 extending through the main body portion 54.

By way of example, referring specifically to the mounting of the outer tube assembly 28 to a frame member 16 shown in FIG. 2, the tang portion 56 engages the outer end 38 of the outer tube 32, with the inner and outer holes 58, 60 positioned inwardly of the frame member 16, and the main body portion 54 of the bracket 50 engages the upper leg 18 of the frame member 16. Legs 62 of the U-bolt 52 extend through the inner holes 58 and bight portion 64 of the U-bolt engages the outer spacer tube 34. The U-bolt 52 is tightened to somewhat flatten the tang portion 56 with respect to the main body portion 54. In this manner, the angular disposition of the tang portion 56 with respect to the main body portion 54 imparts a preload condition to the mounting bracket 50 so that when the same, in conjunction with the U-bolt 52, mounts the outer tube 32 to the frame member 16, a torqued condition is created causing the tang portion to bite into the outer end 38 of the outer tube 32 to provide a secure mounting of the outer tube 32 to the frame member 16. A plurality of setscrews 66 extend through the threaded weld nuts 42 secured to the outer end 38 of the outer tube 32 and matingly engage outer surface 68 of the inner tube 44 to stabilize the mounting of the outer and inner tubes 32, 44 to the frame members 16.

Figure 3:
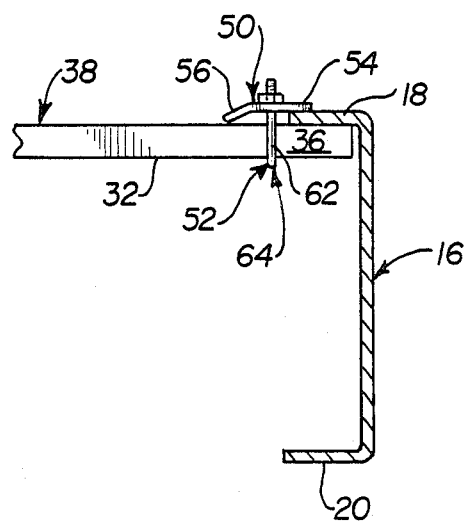
FIG. 3 is an enlarged front elevational view of a connection between the vehicle load sensing device and the vehicle frame.

It should be noted that the outer and inner tube assemblies 28, 30 can be adjustably mounted to the frame 12 in a variety of positions relative to the frame members 16. For example, the assemblies 28, 30 can be mounted anywhere along the length of the frame members 16 so as to position the sensing unit 22 and clinometer 24 in proper position over the vehicle axle 14 to permit the mounting of the sensing unit and clinometer to the axle. In addition, the mounting brackets 50 and the U-bolts 52 can mount the outer and inner tube assemblies 28, 30 to either the upper or lower legs 18, 20 of the frame members 16, thereby permitting vertical adjustment of the mounting of the assemblies 28, 30 to the frame 12 to accommodate the mounting to fit vehicles varying with respect to the vertical distance between the frame and axle. Vertical adjustment of such mounting is also accomplished by reorientation of the mounting shown in FIG. 2, where, for example, the outer tube 32 and the outer spacer tube 34 are positioned in vertically stacked relationship, to the mounting shown in FIG. 3, where the tubes 32, 34 are positioned in horizontal side-by-side relationship. In the latter mounting illustrated in FIG. 3, a U-bolt 52 wider than that shown in FIGS. 1 and 2 must be used to mount the tubes 32, 34 to the frame member 16. The wider U-bolt extends through the outer holes 60 rather than the inner holes 58 in the mounting bracket 50. It should also be noted that the mounting of the outer and inner tube assemblies 28, 30 to the frame 12 illustrated in FIGS. 2 and 3 can be made with respect to either the upper or lower legs 18, 20 of the frame members 16. Further, the outer tube 32 and outer spacer tube 34 can be positioned such that these tubes are disposed in inverse relationship to that shown in FIGS. 1 and 2.

It is further noted that the external dimensions of the inner spacer tubes 46 are substantially equal to the external dimensions of the outer tubes 32, 34 so as to achieve a level mounting of the outer and inner tubes 32, 44 to the frame members 16.

In addition to being mounted to the frame 12, the sensing unit 22 and the clinometer 24 is mounted to the vehicle axle 14 and specifically to a vehicle differential 70. The differentials of vehicles generally include front and/or back differential plates securely attached to the differentials through a plurality of bolts extending through aligned holes in the differential plates and the differentials. The connection between the sensing unit 22 and the clinometer 24 mounted thereto and the differential 70 takes advantage of this vehicle construction. Specifically, as illustrated in FIGS. 2 and 5, the sensing unit 22 is mounted to the differential 70 through a differential bracket 72 having upper and lower holes (not shown) extending through upper and lower ends 74, 76 of the bracket. The bracket 72 is mounted to the differential by removing a bolt 78 from the differential plate 80 and differential 70 and placing the bracket 72 adjacent the differential so that the lower hole (not shown) of the bracket 72 is aligned with the aligned holes (not shown) in the differential plate 80 and the differential 70. The bolt 78 is then set in registry with the aligned holes (not shown) to mount the differential bracket 72 to the differential 70. The upper hole (not shown) extending through the upper end 76 of the differential bracket 72 functions to mount the sensing unit 22 to the bracket 72 as will be described below in detail.

It should be noted that the differential bracket 72 can be mounted to the differential 70 in the above-described manner through any one of the bolts 78 mounting the differential plate 80 to the differential 70. In this manner, the bracket is adapted to mount to vehicles varying with respect to undercarriage design so as to be in a position for mounting the sensing unit 22 through the upper hole (not shown) in the upper end 74 of the bracket 72.

The outer and inner tube assemblies 28, 30 adjustably mount the sensing unit 22 and the clinometer 24 to the vehicle frame 12 through a bracket assembly 82 removably and movably mounted to the outer tube 32. As illustrated in FIGS. 1, 2, and 5, the bracket assembly 82 comprises an L-bracket 84 and a tang bracket 86. The L-bracket 84 includes a vertical, relatively long leg 88 having a central, relatively small opening 90 and a lower, relatively large opening 92. The vertical long leg 88 has rigidly secured thereto, as by welding, a tube 116 set in registry with the lower opening 92. The tube 116 extends outwardly of the vertical long leg 88 and houses a bearing (not shown). The tube 116 and bearing (not shown) housed therein function to mount the sensing unit 22 and the clinometer 24 to the bracket assembly 82 as will be described below. The L-bracket 84 also includes a horizontal, relatively short leg 94 positioned substantially perpendicular to the long leg 88 and having an elongated slot 96 extending therethrough adjacent a free end 98 of the short leg 94. The tang bracket 86 is substantially square and has a tang 100 extending outwardly from an axial edge (not shown) of the tange bracket 86 and a orifice 104 extending therethrough adjacent an edge 102 of the tange bracket opposite the tang 100. The tang 100 has dimensions substantially equal to, but slightly smaller than, those of the slot 96 in short leg 94 of the L-bracket 84 and is adapted to be set in registry with the slot 96. In addition, the tang bracket 86 is bent at 106, the bend extending transversely of an axial line connecting the tang 100 and the orifice 104.

When the bracket assembly 82 is mounted to the outer tube assembly 28, the long vertical leg 88 of the L-bracket 84 engages the front wall 36 or the rear wall 108 of the outer tube 32 and the short horizontal leg 94 engages the top wall 110 of the outer tube. In addition, the tang bracket 86 engages the front wall 36 or the rear wall 108 of the outer tube 32, with the tang 100 positioned in registry with the slot 96 and the orifice 104 aligned with the central opening 90 of the long leg 88 of the L-bracket 84. Further, the aligned orifice 104 and central opening 90 are positioned below the outer tube 32. A bracket bolt 114 extends through the aligned orifice 104 and opening 90 to mount the bracket assembly 82 to the outer tube 32. When the bolt 114 is torqued, the brackets 84, 86 are drawn tightly together to provide a secure mounting of the bracket assembly 82 to the outer tube 32. The bend 106 of the tang bracket 86, in conjunction with the tang-slot connection between the tang bracket 86 and L-bracket 84, creates a torqued condition when the bracket assembly 82 is mounted to the outer tube 32. The bracket assembly 82 can be removably mounted anywhere along the length of the outer tube 32 so as to place the sensing unit 22 and the clinometer 24 in the proper position over the vehicle differential 70 for mounting thereto.

The bracket assembly 82 can be mounted to the outer tube 32 in a position inverted from that shown in FIG. 2. In such inverted position, the assembly 82 is mounted to the outer tube 32 in the exact manner described above, except that the short horizontal leg 94 of the L-bracket 84 engages the bottom wall 112 of the outer tube 32 rather than the top wall 110 of the same. In addition, in the inverted position, the sensing unit 22 is mounted to the outer tube 32 in a higher position relative to the differential 70 than when the assembly 82 is mounted in the position shown in FIG. 2. The ability of the bracket assembly 82 to so mount provides additional flexibility to the device for mounting to and between the frame and axle of vehicles varying with respect to undercarriage design.

In an alternative embodiment of the bracket assembly 82, as shown in FIG. 4, the assembly comprises a front bracket 118 and a rear bracket 120. The front bracket 118 includes four openings (not shown) extending therethrough and adjacent the four corners of the bracket. The front bracket 118 is positioned in front of and matingly engages the front wall 36 of the outer tube 32 such that two of the openings (not shown) are positioned above and two of the openings (not shown) are disposed below the outer tube 32. The rear bracket 120 is positioned behind and engages the back wall 108 of the outer tube 32 and has four openings (not shown) aligned with the openings (not shown) of the front bracket 118. Four bolts 122 extend through the aligned openings (not shown) in the front and back brackets 118, 120 to securely mount the bracket assembly 82 to and substantially anywhere along the length of the outer tube 32. The rear bracket 120 also includes a lower, central opening (not shown) through which the sensing unit 22 is rotatably mounted.

As shown in FIGS. 1 and 2, and as best illustrated in FIG. 5, the sensing unit 22 comprises an adjustable rod 124 and a pivot arm 126. The adjustable rod 124 comprises a bearing 130 having a pair of vertical bores 132 extending through upper and lower walls 134, 136 of the bearing and a pair of threaded horizontal bores 138 extending through sidewalls 140 of the bearing and opening into the vertical bores 132. A pair of rods 142 are slidably set in registry with vertical bores 132. The overall length of the adjustable rod 124 can be varied by telescopically engaging the rods 142 to a greater or lesser extent with respect to the bearing 130. This adjustment feature of the rod 124 provides for further versitility of the device 10 for mounting to vehicles varying with respect under carriage design. A pair of horizontal bolts 144 threadably engage the bearing 130, through the horizontal bores 138, and securely and matingly engage the rods 142 to fix the same in adjusted position relative to each other and the bearing.

The adjustable rod 124 is securely mounted to and between the differential bracket 72 and the pivot arm 126, the latter being mounted to the bracket assembly 82. To this end, the adjustable rod 124 includes a pair of ball-end connectors 146. One ball end connector 146 is securely attached to a first free end 148 of one of the rods 142. The other ball end connector 146 is attached to a second free end 149 of the other rod 142 opposite the first free end 148. As shown in FIG. 6, the ball end connectors 146 include bearing portions 150 mounted to the ends 148, 149 of the rods 142 and ball-end bolts 152 mounted within the bearing portions for rotational movement in a variety of directions in three-dimensional space. The bolt 152 of one of the ball-end connectors 146 is set in registry with aligned holes (not shown) extending through the differential bracket 72 and the diferential 70 to movably mount the adjustable rod 124 to the differential 70. The other ball-end connector 146 is mounted to the pivot arm 126. Specifically, the ball-end bolt 152 of the other connector 146 is selectively positioned in registry with any one of a plurality of spaced holes 154 extending along and through a central longitudinal axis of the pivot arm 126 on an outer end 156 thereof. In this manner, the adjustable rod 124 can be mounted to and disposed along any one of a number of positions on the pivot arm 126 so as to further facilitate mounting of the device to vehicles varying with respect to undercarriage design. It should be noted that an elongated slot (not shown) extending along the length of the longitudinal axis of the arm 126 would also provide such adjustment feature.

It should be further noted that ball-end connectors 146 are preferred in mounting the adjustable rod 124 to and between the pivot arm 126 and the differential 70 rather than a fixed bolt connection. The use of ball-end connectors allows for lateral, longitudinal and angular movement of the differential with respect to the frame, as a result of torques exerted on the vehicle drivetrain during operation of the vehicle, without the incurrence of damage to the device 10. A fixed bolt connection between the sensing unit 22 and the vehicle frame 12 and differential 70 would not provide such flexibility in the mounting.

As stated above, the pivot arm 126 is rotatably mounted to the bracket assembly 82. To this end, the pivot arm has rigidly secured, as by welding, to an inner end 157 of the arm, a nut 160. The nut 160 is aligned with the tube 116, and bearing (not shown) housed therein, mounted to the long leg 88 of the L-bracket 84 of the bracket assembly 82. A connector bolt 162 is positioned through the bearing (not shown) and threaded onto the nut 160 to securely and rotatably mounted the pivot arm 126 to the bracket assembly 82.

In the alternative embodiment of bracket assembly 82 shown in FIG. 4, the rear bracket 120 engages and is positioned adjacent the pivot arm 126 such that the lower central opening (not shown) of the bracket 120 is aligned with the nut 160 of the pivot arm 126. In addition, the connector bolt 162 is set in registry with the aligned opening (not shown) and nut 160 to rotatably mount the pivot arm 126 to the bracket assembly 82.

In operation of the foregoing elements, when a load is placed on a vehicle frame 12, the frame depresses with respect to the vehicle differential 70. Due to the above-described connection between the pivot arm 126 and the adjustable rod 124 to the vehicle frame 12 and axle 14, respectively, the pivot arm is caused to rotate about its pivot axis to thereby detect such vertical displacement of said frame relative to said axle. The angular deflection of the arm 126 is measured by the clinometer 24 which converts the angular measurement into a coherent digital or analogue readout displayed by the receiving unit 26 electrically connected to the clinometer and which can be conveniently positioned in the vehicle cockpit (not shown). In this manner, the vehicle operator can monitor the amount of load carried on the vehicle to ensure that the vehicle is not "overweight" or substantially "underweight." The receiving unit 26 is connected to a power source which is preferably the vehicle battery (not shown) or its own power source.

As stated above, the preferred means utilized in connection with the invention for measuring angular deflection of the arm 126 is a clinometer. The clinometer 24 is securely mounted to the pivot arm 126 on the pivotal axis of the same with respect to the bracket assembly 82. This mounting can be achieved in a variety of ways, but preferably comprises a bolted connected between the clinometer 24 and the arm 126 by bolts (not shown) extending through aligned holes (not shown) in the pivot arm 126 and flanges (not shown) extending outwardly from sidewalls 168 of the clinometer 24. In addition, the device 10 preferably comprises a cover 172 securely mounted, as by welding, to the arm 126 and covering the clinometer 24 to protect the same from extraneous matter, such as stones, grease and dust, incident on the device during operation of the vehicle.

The specific construction of the clinometer 24 preferably utilized in connection with the invention is disclosed in a publication entitled "Capacitance Based Angular Measurement" by Tom Donahoe, *Sensors Magazine* (November, 1985). The clinometer is also disclosed in an article in the June 1986 issue of a trade publication entited *Design News* and authored by the above-identified author. The clinometer 128 is commercially available from Sperry Corporation of Phoenix, Ariz. under the trademark ACCUSTAR. Briefly, as indicated above, the clinometer employed is a capacitive gravity sensor adapted to measure angular deflection of an article and comprises, in part, two chamber halves (not shown) with a capacitor plate (not shown) sandwiched therebetween. The capacitor plate is chemically etched to form two distinct capacitor plates (not shown). The chamber is filled with a dielectric fluid (not shown) and an inert gas (not shown). When the chamber is rotated in response to rotation of the article, in the present case the arm 126, the liquid and gas in the chamber are moved with respect to the two capacitor plates. Since the fluid has a greater dielectric constant than the gas, it becomes the dominant medium in terms of capacitance. Thus, if one capacitance plate is submerged more than the other, it will exhibit a higher capacitance. A digital or analogue IO transducer, referred to herein as the receiving unit 26, can be used to transform the differential capacitance into a coherent readable form. A U.S. patent application has been filed by Sperry on its Accustar capacitive gravity clinometer. However, the application has not matured into a patent as of the filing date of this application.

Incorporation of the clinometer 24 in the device 10 for measuring angular deflection of the pivot arm 126 when loads are exerted on the vehicle frame 12 first requires calibration of the device so that the receiving unit reads "0" when no loads are exerted on the frame 12. Thereafter, a measured load is placed to bear on the frame, with such measured load being at the maximum legal load limit permitted. A reading of the receiving unit can then determine the scale reading on the receiving unit 26 indicating the maximum legal load permitted for the vehicle.

It is contemplated that more than one sensing unit 22 can be mounted to the vehicle in the manner described above. For example, a sensing unit 22 can be placed on each axle of the vehicle to determine the magnitude of loads exerted on each axle so as to not exceed the maximum legal load permitted for each axle. For this purpose, a multipositioned selector switch (not shown) can be used in connection with a single digital or analogue receiving unit, with each sensing unit being associated with a different position on the switch.

The majority of the above-described elements of the device 10 are preferably constructed of noncorrosive material, but particularly of strong material in order to provide an extended life for such elements.

While the invention has been described in connection with a preferred embodiment, it will be understood that the invention is not limited to the disclosed embodiment. To the contrary, reasonable variations, alternatives, modifications and equivalents are possible within the spirit and scope of the invention as defined by the appended claims.

The embodiments of the invention in which an exclusive property or privilege is claimed are defined as follows:

1. In a device adapted to be mounted to a vehicle for providing an indication of loads exerted on said vehicle, said vehicle comprising a drivetrain and a frame movable relative to said drivetrain, said frame comprising, on each side of said vehicle, an elongated substantially C-shaped, in cross section, frame member having upper and lower legs extending along longitudinal axes of said frame member and said device comprising a sensing means operable between said frame and said drivetrain and for detecting an alteration in distance between said frame and said drivetrain when a load is exerted on said vehicle, a clinometer means responsive to said sensing means for converting said alteration in distance detected by said sensing means to an output signal, a receivig means for receiving said output signal and indicating magnitude of a load exerted on said vehicle and a frame mounting means for mounting said sensing and clinometer means to said vehicle frame; the improvement wherein:

said sensing means comprises an arm pivotably mounted to said frame mounting means and adapted to rotate in response to an alteration in distance between said frame and said drivetrain;

said clinometer means comprises a capacitive gravity sensor mounted to said arm and adapted to rotate with said arm, to measure rotational movement of said arm and to convert said rotational movement into said output signal; and said frame mounting means comprises a first mounting means adapted to be mounted to and anywhere along the length of one of said frame member upper and lower legs to selectively mount said sensing means at any one of a number of vertical and longitudinal positions relative to said frame.

2. In a device according to claim 1, wherein said first mounting means is adapted to be selectively mounted to one of said upper and lower legs at a plurality of vertical positions relative to one of said upper and lower legs.

3. In a device according to claim 2, wherein said frame mounting means is adapted to be mounted on said frame, with a longitudinal axis of said frame mounting means extending substantially perpendicular to said frame, said frame mounting means comprising a dimension in a first direction substantially perpendicular to said longitudinal axis and a dimension in a second direction unequal to said dimension in said first direction and substantially perpendicular to said first direction and said longitudinal axis;

whereby said frame mounting means can be rotated about its longitudinal axis to alter the vertical position of said sensing means relative to said frame.

4. In a device according to claim 1, wherein said frame mounting means comprises a second mounting means for selectively mounting said sensing means at any one of a number of positions transverse of said frame.

5. In a device according to claim 4, wherein said frame comprises a pair of spaced frame members;

said frame mounting means comprises an elongated member adapted to be mounted to and between said spaced frame members; and said second mounting means is adapted to be mounted to and along a longitudinal axis of said elongated member to mount said sensing means at any one of a number of positions transverse of said frame.

6. In a device according to claim 1, wherein said frame comprises a pair of spaced frame members; and said frame mounting means comprises a pair of telescoping tubes adapted to be mounted to and between said spaced frame members and to move longitudinally relative to each other to extend or contract the length of said frame mounting means to adjust the length of said frame mounting means in accordance with the distance between said spaced frame members.

7. In a device according to claim 1, wherein said device further comprises a drivetrain mounting means for mounting said sensing means to said vehicle drivetrain; and said sensing means further comprises an adjustable rod means adapted to be mounted to and between said drivetrain means and said pivoting arm and adjusted longitudinally to vary the length of said rod means.

8. In a device according to claim 7, wherein said adjustable rod means comprises a bearing and a pair of substantially parallel first and second vertical rods lockably and telescopically received in said bearing and movable longitudinally relative to each other, with said first rod adapted to be mounted, at a first end thereof, to said pivoting arm and said second rod adapted to be mounted, at a second end thereof opposite said first end of said first rod, to said drivetrain mounting means.

9. In a device according to claim 8, wherein said first and second rods are adapted to be movably mounted to said pivoting arm and drivetrain mounting means, respectively, for movement in a plurality of directions in three-dimensional space.

10. In a device according to claim 9, wherein said adjustable rod means is adapted to be selectively mounted to and along anyone of a number of positions on a longitudinal axis of said pivoting arm.

11. In a device adapted to be mounted to a vehicle for providing an indication of loads exerted on said vehicle, said vehicle comprising a drivetrain and a frame movable relative to said drivetrain, said frame comprising, on each side of said vehicle, an elongated substantially C-shaped, in cross section, frame member having upper and lower legs extending along longitudinal axes of said frame member and said device comprising a sensing means operable between said frame and said drivetrain and for detecting an alteration in distance between said frame and said drivetrain when a load is exerted on said vehicle, a clinometer means responsive to said sensing means for converting said alteration in distance detected by said sensing means to an output signal, a receiving means for receiving said output signal and indicating magnitude of a load exerted on said vehicle and a frame mounting means for mounting said sensing and clinometer means to said vehicle frame, the improvement wherein:

said frame mounting means comprises a first mounting means adapted to be mounted to and anywhere along the length of one of said upper and lower legs for selectively mounting said sensing means at any one of a number of vertical and longitudinal positions relative to said frame.

12. In a device according to claim 11, wherein said frame comprises, on each side of said vehicle, an elongated substantially C-shaped, in cross section, frame member having upper and lower legs extending along longitudinal axes of said frame member; and said first mounting means is adapted to be mounted to and anywhere along the length of one of said upper and lower legs to mount said sensing means at any one of a number of vertical and longitudinal positions relative to said frame.

13. In a device according to claim 11, wherein said first mounting means is adapted to be selectively mounted to one of said upper and lower legs at a plurality of vertical positions relative to one of said upper and lower legs.

14. In a device according to claim 13, wherein said frame mounting means is adapted to be mounted on said frame, with a longitudinal axis of said frame mounting means extending substantially perpendicular to said frame, said frame mounting means comprising a dimension in a first direction substantially perpendicular to said longitudinal axis and a dimension in a second direction unequal to said dimension in said first direction and substantially perpendicular to said first direction and said longitudinal axis;

whereby said frame mounting means can be rotated about its longitudinal axis to alter the vertical position of said sensing means relative to said frame.

15. In a device adapted to be mounted to a vehicle for providing an indication of loads exerted on said vehicle, said vehicle comprising a drivetrain and a frame movable relative to said drivetrain, and said device comprising a sensing means operable between said frame and said drivetrain and for detecting an alteration in distrance between said frame and said drivetrain when a load is exerted on said vehicle, a clinometer means responsive to said sensing means for converting said alteration in distance detected by said sensing means to an output signal, a receiving means for receiving said output signal and indicating magnitude of a load exerted on said vehicle and a frame mounting means for mounting said sensing and clinometer means to said vehicle frame; the improvement wherein:

said sensing means comprises an arm pivotably mounted to said frame mounting means and adapted to rotate in response to an alteration in distance between said frame and said drivetrain;

said device further comprises a drivetrain mounting means for mounting said sensing means to said vehicle drivetrain; and said sensing means further comprises an adjustable rod means adapted to be mounted to and between said drivetrain mounting means and said pivoting arm and adjusted longitudinally to vary the length of said rod means, said adjustable rod means comprising a bearing and a pair of substantially parallel first and second vertical rods lockably and telescopically received in said bearing and movable longitudinally relative to each other, with said first rod adapted to be mounted, at a first end thereof, to said pivoting arm and said second rod adapted to be mounted, at a second end thereof opposite said first end of said first rod, to said drivetrain mounting means.

16. In a device according to claim 15, wherein said first and second rods are adapted to be movably mounted to said pivoting arm and drivetrain mounting means, respectively, for movement in a plurality of directions in three-dimensional space.

17. In a device according to claim 16, wherein said adjustable rod means is adapted to be selectively mounted to and along anyone of a number of positions on a longitudinal axis of said pivoting arm.

18. In a device adapted to be mounted to a vehicle for providing an indication of loads exerted on said vehicle, said vehicle comprising a drivetrain and a frame movable relative to said drivetrain and having a pair of spaced frame members, and said device comprising a sensing means operable between said frame and said drivetrain and for detecting an alteration in distance between said frame and said drivetrain when a load is exerted on said vehicle, a clinometer means responsive to said sensing means for converting said alteration in distance detected by said sensing means to an output signal, a receiving means for receiving said output signal and indicating magnitude of a load exerted on said vehicle and a frame mounting means for mounting said sensing and clinometer means to said vehicle frame, the improvement wherein:

said frame mounting means comprises a pair of telescoping tubes adapted to be mounted to and between said spaced frame members and to move longitudinally relative to each other to extend or contract the length of said frame mounting means to adjust the length of said frame mounting means in accordance with the distance between said spaced frame members.

* * * * *